United States Patent Office 3,023,078
Patented Feb. 27, 1962

3,023,078
PRODUCTION OF URANIUM TETRAFLUORIDE
Robert J. Allen, Revere, and Henry G. Petrow, Lexington, Mass., assignors to the United States of America as represented by the United States Atomic Energy Commission
No Drawing. Filed Mar. 25, 1959, Ser. No. 801,977
4 Claims. (Cl. 23—14.5)

This invention relates to a process for the production of uranium tetrafluoride. More particularly, it relates to a precipitation process for the production of uranium tetrafluoride of suitable purity and density for use in the preparation of uranium metal.

In the past, so-called metal grade uranium tetrafluoride has been produced by the reaction of anhydrous hydrogen fluoride with specially prepared uranium dioxide. This dry method of preparing uranium tetrafluoride requires special equipment and the use of elevated temperatures. In addition, this method requires special uranium dioxide which is made by purifying uranyl nitrate by solvent extraction, thermally decomposing this uranyl nitrate to obtain uranium trioxide, and then reducing this uranium trioxide by means of hydrogen to uranium dioxide.

It has now been found that metal-grade $UF_4$ may be directly and simply produced from purified aqueous uranyl solutions.

In the practice of the present invention, hot, acidified uranyl solutions containing hydrogen fluoride, chloride ions, and a copper ion catalyst are treated with a suitable reducing agent whereupon $UF_4$—$\frac{3}{4}H_2O$ is precipitated as a readily filtrable and high-bulk density product. Reducing agents which have been found suitable are sulfur dioxide, ascorbic acid, hydroxylamine hydrochloride, and hydrazine sulfate. Chloride ions must be present if these reducing agents are to effect the reduction of cupric copper. Therefore, when copper ions are employed to catalyze the reduction of uranyl ions by these reducing agents, chloride ions must also be present.

While the nature of all the reactions occurring in the process of the present invention are not known in detail at the present time, a simplified scheme of the process may be written as follows:

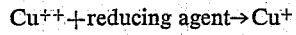

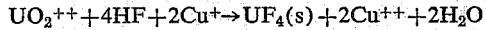

It is seen from these reactions that the copper catalyst serves as an intermediate reductant which permits the use of reducing agents which only slowly, if ever, reduce uranium directly.

It has been found that simple uranyl salt solutions (e.g., sulfate, chloride, nitrate, or mixtures thereof) containing sufficient $H^+$ to prevent hydrolysis of the uranium (approximately 0.1 M-2.0 M) are suitable for the practice of the present invention. These solutions should also be free from deleterious cations such as $Na^+$ or $NH_4^+$, which lead to the precipitation of $NaUF_5$ or $NH_4UF_5$.

The copper catalyst is conveniently added as a cupric salt, such as cupric chloride or sulfate. The catalyst concentration usually employed is in the range of 4 grams per liter of Cu. It will be realized, of course, that the rate of the reduction reaction may be readily controlled by adjusting the concentration of this catalyst. Increasing the copper concentration from 0.0079 molar to 0.063 molar indicated the reaction was first order with respect to the copper concentration. Generally, about 0.166 pound of $CuSO_4$—$5H_2O$ will need to be added to the uranyl solution for every pound of $U_3O_8$ contained therein.

The amount of HF required is determined by the quantity or uranium to be precipitated and may range from just a little in excess of the stoichiometric amount needed to a twofold excess, i.e., 4–8HF/U. Excess fluoride is necessary before the reaction can proceed in a reasonable period of time. Increasing the fluoride concentration increases the rate at which the uranium tetrafluoride precipitates. In order to get reasonably complete precipitation in a six hour period, the fluoride concentration should be from 0.5 to 0.75 mole in excess of that which is required for complete $UF_4$ precipitation.

The reduction of cupric ion by sulfur dioxide does not take place in the absence of chloride ions. Chloride ions are necessary in order to stabilize the cuprous ions. Increasing the chloride concentration from 0.018 molar to 1.12 molar results in a significant increase in the precipitation. In most cases if the chloride concentration is 0.5 molar, the reaction proceeds satisfactorily.

This reaction has been carried out at several different temperatures between 70° C. and 103° C. At lower temperatures near 70° C. it has been found that the precipitated $UF_4$ is bulky and not dense and contains more water of hydration that $UF_4$—$\frac{3}{4}H_2O$. The reaction at these lower temperatures is also undesirably slow. At 103° C. the reaction rate is also undesirably slow due to the low solubility of $SO_2$ in a solution which is at or near its boiling point. In order to obtain good precipitation of a reasonably dense product not having water of hydration greater than that of $UF_4$—$\frac{3}{4}H_2O$, it has been found desirable to carry out the reaction at 80° C. to 95° C. so that the product can be obtained without unduly prolonging the period of reaction.

Good stirring of the reaction mixture is desirable in order to increase the density of the precipitated uranium tetrafluoride.

In order to prepare suitable $UF_4$ with regard to high density and low hydration, it is essential to heat the acidified uranyl solution containing added HF and catalyst to a temperature of 80° to 95° C. prior to adding the reducing agent. Moreover, the reducing agent must be added slowly with adequate stirring of the solution. Suitable reducing agents are $SO_2(g)$, $NH_2OH_2^+$, $N_2H_5^+$, and ascorbic acid. The first of these reductants is superior from the standpoint of economics and ease of addition.

The following examples further illustrate the process of present invention.

EXAMPLE I

Twenty ml. of concentrated HF (48%) and 1 gram of $Cu^{++}$ were added to 250 ml. of 2 M $H^+$ solution assaying 102 grams per liter of $U_3O_8$, 100 grams per liter of $SO_4^{-2}$, and 17 grams per liter of $Cl^-$ contained in a fluoride-resistant, stirred vessel. The resulting solution was brought to a temperature of 80° to 90° C. and thereafter $SO_2$ was slowly bubbled through the stirred solution. After 3 hours, 99.8 percent of the uranium had been precipitated as $UF_4$—$\frac{3}{4}H_2O$.

Table I below gives a typical analysis of the $UF_4$—$\frac{3}{4}H_2O$ produced by the process of the present invention.

Table I $UF_4$ ASSAY

| | Percent |
|---|---|
| U | by weight__ 73.1 |
| F | do____ 23.3 |
| $H_2O$ | do____ 3.6 |
| Cu | p.p.m.__ 14 |
| Tap density | grams/ml__ 3.1–3.3 |

These data indicate that the salt produced was

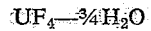

EXAMPLE II

Three runs were made with 250 ml. samples of a feed solution that assayed 102 grams per liter in $U_3O_8$, 100 grams per liter in $SO^{-2}$, and 17 grams per liter in $Cl^-$. After the addition of copper salt and HF, these samples contained 0.091 mole of uranium, 0.60 mole of fluoride (one sample contained 1.2 moles), and 0.031 mole of copper (one sample contained 0.016 mole). $SO_2$ was passed into these samples at 90° C. for 3–4 hours. The yield of $UF_4$—¾$H_2O$ varied from 99.78% to 99.92% and the tap density from 3.12 to 3.18. The yields were practically the same whether 0.034 or 0.067 pound of copper were used per pound of $UF_4$—¾$H_2O$ obtained. Furthermore, the yields were practically the same whether 0.39 or 0.77 pound of fluoride were employed per pound of $UF_4$—¾$H_2O$ obtained.

From the preliminary testing it was found that the preferred procedure to follow in carrying out the present invention includes the following steps: (1) An appropriate volume of solution containing uranium, chloride, and sulfate is charged to the reaction vessel. (2) Copper sulfate pentahydrate is added at a concentration of 0.185 mole of copper per mole of uranium present. (3) Fifty percent hydrofluoric acid is added so that the solution contains four moles of fluoride per mole of uranium present plus 14 grams per liter of free excess fluoride. (4) The solution is heated, with adequate stirring, to between 80° C. and 95° C. (5) Sulfur dioxide is bubbled through the solution at a slow, steady rate so as to maintain a saturated solution. (6) At the completion of runs, the heat, stirring, and gas flow are stopped, and the salt allowed to settle. (7) The mother liquor is decanted off, and the salt washed with water and dried in an oven at 110° C. The runs given in Example III below were carried out in accordance with this procedure.

EXAMPLE III

The following table gives the data of nine large scale runs carried out in accordance with the present invention. The feed solution in each case was about 2 molar in hydrogen ion concentration prior to the addition of HF thereto.

*Table II*

LARGE SCALE PRODUCTION OF $UF_4$—¾$H_2O$

[Temperature: 93° C. to 95° C.]

| Run | Composition of feed in moles per liter | | | | | | Lbs. of $Cu^{++}$ per lb. $UF_4$—¾$H_2O$ | Lbs. of $F^-$ per lb. $UF_4$—¾$H_2O$ | Lbs. of $SO_2$ per lb. $UF_4$—¾$H_2O$ | Reaction time (hours) | Percent recovery | Tap density, g./cc. |
|---|---|---|---|---|---|---|---|---|---|---|---|---|
| | U | $Cu^{++}$ | $F^-$ | $Cl^-$ | $SO_4^-$ | $H^+$ | | | | | | |
| 1 | 0.204 | 0.038 | 1.52 | 0.55 | 0.76 | 3.25 | 0.036 | 0.43 | 0.49 | 6 | 99.46 | 3.17 |
| 2 | 0.231 | 0.042 | 1.65 | 0.65 | 0.86 | 3.65 | 0.037 | 0.41 | 0.71 | 6 | 99.69 | 3.17 |
| 3 | 0.231 | 0.042 | 1.65 | 0.65 | 0.86 | 3.65 | 0.037 | 0.41 | 0.47 | 6 | 99.16 | 3.27 |
| 4 | 0.204 | 0.038 | 1.77 | 0.84 | 0.78 | 3.77 | 0.036 | 0.51 | 0.29 | 5 | 99.57 | 3.00 |
| 5 | 0.635 | 0.119 | 3.25 | 0.89 | 0.89 | 5.25 | 0.036 | 0.30 | 0.28 | 7 | 99.92 | 2.90 |
| 6 | 0.453 | 0.086 | 2.52 | 0.91 | 0.91 | 4.52 | 0.036 | 0.32 | 0.37 | 6 | 99.92 | 3.02 |
| 7 | 0.453 | 0.086 | 2.52 | 0.91 | 0.91 | 4.52 | 0.036 | 0.32 | 0.29 | 6 | 99.91 | 3.17 |
| 8 | 0.453 | 0.086 | 2.52 | 0.91 | 0.91 | 4.52 | 0.036 | 0.32 | 0.29 | 6 | 99.87 | 3.08 |
| 9 | 0.453 | 0.086 | 2.52 | 0.91 | 0.91 | 4.52 | 0.036 | 0.32 | 0.29 | 6 | 99.90 | 3.11 |

In the runs set forth in the above table sulfur dioxide was used in amounts which varied from 50 percent to 200 percent over stoichiometric requirements. No additional reaction time was necessary when a smaller excess of sulfur dioxide was used. Enough sulfur dioxide must be employed so that the solution is essentially saturated with sulfur dioxide throughout the run.

Uranium tetrafluoride precipitated in accordance with this catalytic reduction process is a dark green crystalline material having a tap density between 2.60 and 3.36 grams per cubic centimeter. By tap density is meant the weight of salt that can be packed in a graduate by moderately tapping it. The copper contamination in the precipitated salt is 40 parts per million or less.

After the $UF_4$—¾$H_2O$ has precipitated it is washed with water by decantation and filtered. It is then oven dried at 110° C. Since the dried salt is a hydrate, the final step is to dehydrate it. This $UF_4$—¾$H_2O$ may be dehydrated by heating in a vacuum at 400–650° C. or in a flush stream of nitrogen or air at 350–650° C. The dehydrated salt may then be reduced to metallic uranium by conventional bomb reduction methods.

The process of the present invention offers an extremely simple method of preparing $UF_4$ for use as an intermediate in the production of uranium metal or $UF_6$. Its simple reagent and equipment requirements in comparison with present involved production processes proves its utility. It is to be further noted that chloride strip solutions from amine extraction of uranium leach liquors may be used directly in the process of the present invention.

The novelty of the present invention resides in some measure in combining the uranyl solution and hydrofluoric acid and heating the resultant mixture prior to addition of the reducing agent. This procedure leads to essentially a homogeneous precipitation of $UF_4$ with attendant benefits of high purity, crystallinity, low hydration, and high bulk density. Of much greater novelty is the provision of a copper catalyst which permits the use of such cheap reducing agents as sulfur dioxide.

There are a number of advantages of the copper catalyzed sulfur dioxide reduction process for the production of uranium tetrafluoride over other methods for the wet chemical precipitation of uranium tetrafluoride. (1) The equipment used is simple and easy to operate. (2) The reagents used are cheap and readily available. (3) No volume change occurs during the reaction, which keeps the $UF_4$ solubility at a minimum. (4) The reaction is easily controlled. (5) Contamination of the product by reagents is at a low level. (6) The use of gas results in a homogeneous type of precipitation which which is conducive of good crystal growth and low impurity occlusion. (7) This method consistently produces salt of the desired density. (8) If it be necessary to recover the excess reducing agent, this can be accomplished by liquefaction of the exit gas at −10° C.

Resort may be had to such modifications and variations as fall within the spirit of the invention and the scope of the appended claims.

We claim:

1. A process of preparing uranium tetrafluoride from an acid solution of a uranyl salt containing chloride ions which comprises adding cupric ions and fluoride ions thereto, heating said solution to 80–95° C., reducing said solution by means of sulfur dioxide, and recovering the uranium tetrafluoride that precipitates.

2. A process of preparing $UF_4$—¾$H_2O$ from an acid solution of a uranyl salt containing chloride ions which comprises adding cupric ions and fluoride ions thereto, heating said solution to 80–95° C., then passing gaseous $SO_2$ through said solution, and recovering the precipitated $UF_4$—¾$H_2O$.

3. A process of preparing $UF_4$—¾$H_2O$ which comprises passing $SO_2$ into an acid solution of uranyl sulfate which is 0.0079 to 0.063 molar in cupric ions, 0.018 molar to 1.12 molar in chloride ions and which contains an excess of fluoride ions over what is required for complete $UF_4$ precipitation, said solution being heated at 80–95° C. while $SO_2$ is being passed thereinto, and recovering the precipitated $UF_4$—¾$H_2O$.

4. A process of preparing $UF_4$—¾$H_2O$ which comprises charging a reaction vessel with a uranyl sulfate solution containing chloride ions, adding enough cupric ions to make the solution from 0.0079 molar to 0.063 molar with respect to copper, adding enough hydrogen fluoride to the solution so that the solution contains from 0.5 to 0.75 mole of fluoride ions in excess of what is stoichiometrically required for complete $UF_4$ precipitation, heating the solution at 80–95° C., passing $SO_2$ into the solution, and recovering the precipitated $UF_4$—¾$H_2O$.

References Cited in the file of this patent

UNITED STATES PATENTS

| | | |
|---|---|---|
| 2,689,165 | Harvey | Sept. 14, 1954 |
| 2,880,059 | Tolley | Mar. 31, 1959 |

OTHER REFERENCES

Allen et al.: "Ind. and Eng. Chem., vol. 50, No. 12, December 1958, pp. 1748 and 1749.

WIN–90 (AEC Report), pages 1 and 14–34, May 15, 1958.